(12) United States Patent
Brodeur et al.

(10) Patent No.: US 8,677,194 B2
(45) Date of Patent: Mar. 18, 2014

(54) METHOD AND SYSTEM FOR SITE CONFIGURABLE ERROR REPORTING

(75) Inventors: Heather Brodeur, Westford, MA (US); David Malcolm, Westford, MA (US); John W. Lockhart, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 631 days.

(21) Appl. No.: 11/564,559

(22) Filed: Nov. 29, 2006

(65) Prior Publication Data

US 2008/0126887 A1 May 29, 2008

(51) Int. Cl.
*G06F 11/00* (2006.01)

(52) U.S. Cl.
USPC .............................. 714/57; 714/38.14; 714/46

(58) Field of Classification Search
USPC ...................................... 714/26, 57, 38.14, 46
See application file for complete search history.

(56) References Cited

U.S. PATENT DOCUMENTS

| | | | | |
|---|---|---|---|---|
| 6,539,499 B1 * | 3/2003 | Stedman et al. | ................. | 714/40 |
| 6,697,969 B1 * | 2/2004 | Merriam | ......................... | 714/46 |
| 6,859,783 B2 * | 2/2005 | Cogger et al. | .................. | 705/10 |
| 6,898,733 B2 * | 5/2005 | Parks et al. | ...................... | 714/15 |
| 6,983,452 B1 * | 1/2006 | Willems | ........................ | 717/128 |
| 7,058,927 B2 * | 6/2006 | Yenne et al. | .................. | 717/128 |
| 7,127,642 B2 * | 10/2006 | Wang et al. | ..................... | 714/45 |
| 7,137,043 B1 * | 11/2006 | Kane et al. | ....................... | 714/57 |
| 7,171,593 B1 * | 1/2007 | Whittaker et al. | .............. | 714/57 |
| 7,225,367 B2 * | 5/2007 | Hashem et al. | ................. | 714/48 |
| 7,350,115 B2 * | 3/2008 | Mathew et al. | ................. | 714/46 |
| 7,509,536 B1 * | 3/2009 | Kane et al. | ...................... | 714/46 |
| 7,533,305 B2 * | 5/2009 | Behdjati et al. | ................. | 714/57 |
| 8,055,954 B2 * | 11/2011 | Lenart et al. | .................... | 714/48 |
| 2002/0091968 A1 * | 7/2002 | Moreaux et al. | ................ | 714/38 |
| 2002/0162053 A1 * | 10/2002 | Os | ................................... | 714/38 |
| 2003/0208593 A1 * | 11/2003 | Bharati et al. | ................. | 709/224 |
| 2004/0057572 A1 * | 3/2004 | O'Connor et al. | ........ | 379/266.01 |
| 2004/0153792 A1 * | 8/2004 | Merriam | ......................... | 714/26 |
| 2005/0081115 A1 * | 4/2005 | Cheng et al. | .................... | 714/47 |
| 2006/0136784 A1 * | 6/2006 | Prescott et al. | ................. | 714/38 |
| 2007/0101208 A1 * | 5/2007 | Mohr | ............................... | 714/57 |
| 2008/0172583 A1 * | 7/2008 | Mahajan et al. | ................ | 714/57 |
| 2008/0250267 A1 * | 10/2008 | Brown et al. | ...................... | 714/4 |
| 2008/0256399 A1 * | 10/2008 | Erdosi et al. | .................... | 714/47 |

* cited by examiner

*Primary Examiner* — Bryce Bonzo
*Assistant Examiner* — Elmira Mehrmanesh
(74) *Attorney, Agent, or Firm* — Lowenstein Sandler LLP

(57) ABSTRACT

Embodiments of the present invention relate generally to error reporting methods and systems. An error reporting application may be configured to be a stand-alone program, embedded within another application, or added as a plug-in application. The error reporting application may also be configured to provide a mechanism for a user to describe a problem with another application and send the problem description to a configurable, user defined location. The error report from the error reporting application may then be processed by an error processing system at the user-defined location.

29 Claims, 4 Drawing Sheets

METHOD AND SYSTEM FOR SITE CONFIGURABLE ERROR REPORTING

FIELD

This invention generally relates to reporting errors or bugs. More particularly, the invention relates to a method and system for user configurable error reporting.

DESCRIPTION OF THE RELATED ART

Software development may involve a long process to develop an application such as an Internet browser, a music player program, or a new operating system. Time is spent in planning the features, coding and testing. Although the testing of an application may be rigorous, bugs may likely appear. Computer bugs are errors, flaws, mistakes, failures, or faults in the computer application that prevent it from working correctly or produce an incorrect result. Bugs arise from mistakes and errors, made by people, in either a program's source code or its design. It is said that there are bugs in all useful computer programs, but well-written programs contain relatively few bugs, and these bugs typically do not prevent the program from performing its task.

The software developers may be interested in the computer bugs. For example, the bugs provide a method of quality control to improve the functionality of the application. As a result, some software developers may provide a mechanism for reporting errors. For example, one software developer may create a website for users to report any bugs or errors. Another example is Microsoft Windows XP operating system which asks the user to report errors to Microsoft in the event of an application error. Yet another example is Safari (Apple Computer's web browser), which has a feature that allows a user to report a bug to Apple Computer.

Although it useful for the software developers to know of the errors, the user rarely receives feedback from the error reporting. For site administrators of large information technology departments supporting many corporate users, the reporting of errors may be a useful tool to measure the health of the corporate network and/or applications. However, the errors that are detected by the corporate users are reported directly to the developer of the applications. A site administrator may not have easy access to the errors being detected and reported from his own network.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of networked computer systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Various embodiments relate generally to an error reporting application. The error reporting application may be configured to be a stand-alone program, embedded within another application, or added as a plug-in application. The error reporting application may also be configured to provide a mechanism for a user to describe a problem with another application and send the problem description to a configurable, user defined location. For example, an error associated with an application may be forwarded to a help desk of an internal user support group of a corporation. The error report from the error reporting application may be processed by an error processing system at the user-defined location. More particularly, the error processing system may log the received error report and generate a repair ticket for a technician or engineer to resolve.

Another embodiment relates generally to a system for error reporting. The system includes a plurality of computers, where each computer executes at least one application. The system also includes a network configured to interconnect each computer of the plurality of computers. A selected computer is configured to execute an error reporting application configured to display an error report for a user to describe a bug in the at least one application in response to the bug being detected by the user and transmitting the error report to a site-administrator defined location.

Figure 1:
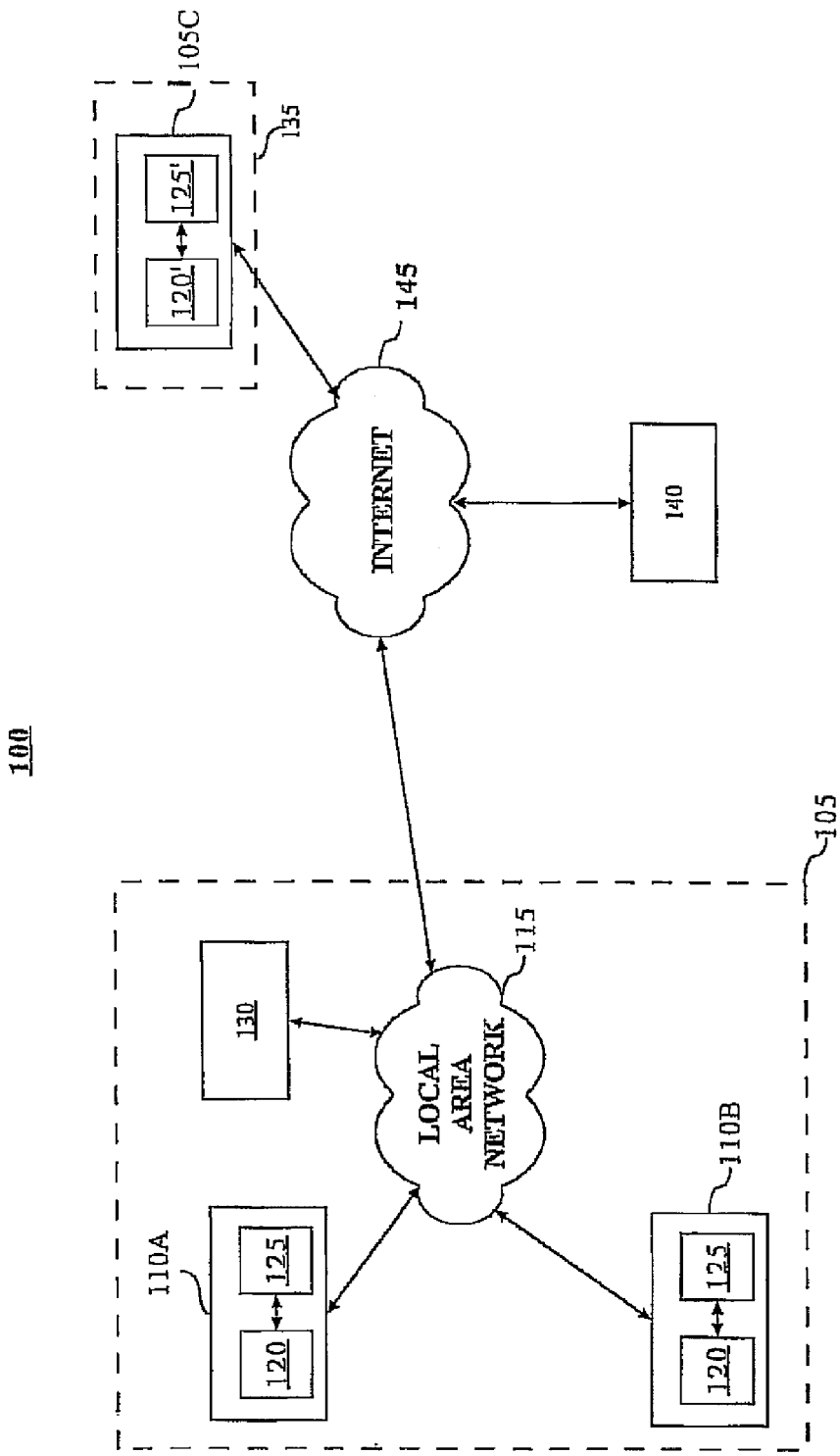
FIG. 1 illustrates an exemplary block diagram of a system in accordance with an embodiment of the invention.

FIG. 1 illustrates a block diagram of a system 100 in accordance with an embodiment. It should be readily apparent to those of ordinary skill in the art that the system 100 depicted in FIG. 1 represents a generalized schematic illustration and that other components may be added or existing components may be removed or modified.

As shown in FIG. 1, the system 100 includes a cluster 105 of multiple computing platforms 110A-B connected by a local area network 115. The cluster 105 may represent an organization such as a corporation, manufacturer, university or other similar entity. The computing platforms 115A-B may be implemented using personal computers, laptops, workstations, and other similar devices. The computing platforms 110A-B may interface with the local area network 115 through a network interface (not shown). The network 115 may be implemented using network protocols X.25, IEEE 802.11, FDDI or other similar local area protocol as known to those skilled in the art.

Each computing platform 105A-B may execute at least one application 120 such as a word processing, spreadsheet, Internet browser, etc. The computing platform 105A-B may also execute an error reporting application 125. The error reporting application 125 may be configured to provide a mechanism for a user to report a problem, bug, or error. The user may invoke the error reporting application 125 from within the at least one application 120. The error reporting application 125 may take a screen shot of the current state of the at least one application and attach the screen shot to a displayed error report interface. The error report interface provides a mechanism to further describe the detected bug. The error report interface also provides a destination field that allows a user or site administrator of the cluster 105 to specify the location of where to send the displayed error report. In other embodiments, the error reporting application 125 may be a stand-alone application, a subroutine or module built into the at least one application 120 or as a plug-in application.

The error reporting application 125 may transmit the error report to the error reporting site 130. The error reporting site 130 may be an Internet location set up by the site administrator of the cluster 105. The error reporting site 130, for example, may be an internal help desk designed to assist the users of cluster 105.

The error reporting site 130 may be configured to interface with the local area network 115. The local area network 115 may provide a communication channel for computing platform 110A-B to transmit messages between the error reporting application 125 and the error reporting site 130. The error reporting site 130 may include a database configured to store data. The error reporting site 130 may also include software that generates a repair ticket in response to the received error report. An engineer and/or technician may be assigned to the repair ticket to resolve the issue with the user.

The system 100 may also include a single user 135 with a computing platform 105C. Similarly, the computing platform 105C may have similar characteristics as computing platform 105A-B, i.e., the computing platform 105C may execute at least one application 120' and the error reporting application 125'. However, the error reporting application 125' of computing platform 105C may transmit the error reports to support site 140 over the Internet 145. The support site 140, like error reporting site 130, may similarly process the error reports and generate repair tickets. However, the support site 140 may be a third party vendor that single user 135 has contracted for computer application support.

In various other embodiments, the single user 135 may transmit its error reports to the error reporting site 130 if the single user 135 is a remote user of the cluster 105. Similarly, the users of cluster 105 may transmit their error reports to support site 140 directly or in addition to error location site 130.

System 100 may also include other features (not shown). For example, system 100 may include a bug aggregation gateway that aggregates bugs reported from users for a particular site or enterprise. In turn, this aggregation gateway may then be configured to provide an aggregated bug report at various intervals or as error reports are received. System 100 may also include a bug solution gateway (not shown). A bug solution gateway may be coupled to various sites on Internet 145 and provide the users with possible solutions to an error report. The bug solution gateway may also be configured to provide proposed solutions based on preferences configured by the user or the site where the user is located. Other components may also be included in system 100.

Figure 2:
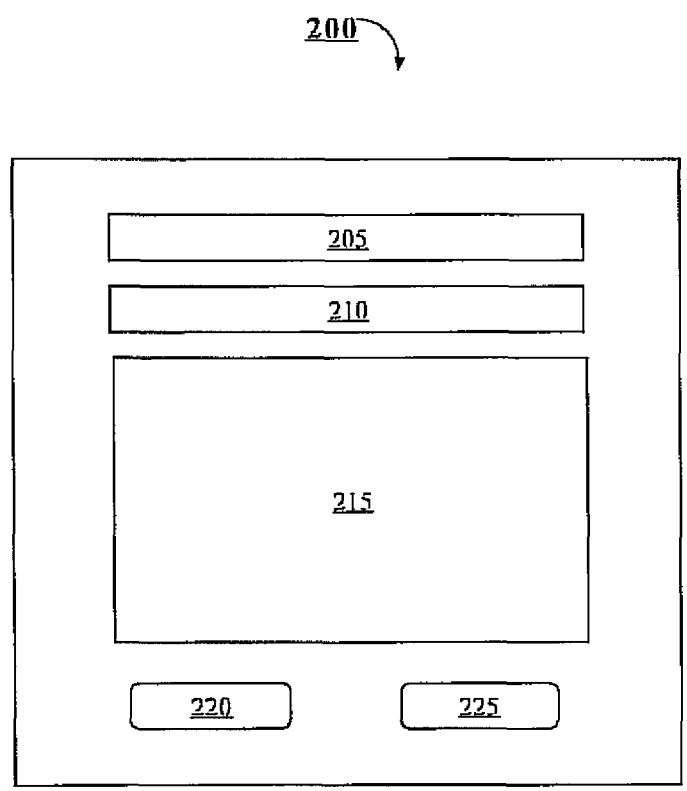
FIG. 2 illustrates an exemplary interface for the error reporting application in accordance with another embodiment of the invention.

FIG. 2 illustrates an exemplary user interface 200 for an error report in accordance with an embodiment. It should be readily apparent to those of ordinary skill in the art that the software environment 200 depicted in FIG. 2 represents a generalized schematic illustration and that other fields and/or buttons may be added or existing fields and/or buttons may be removed or modified.

As shown in FIG. 2, the user interface 200 may include an error location site field 205, file attachment field 210, a description field 215, a submit button 220 and a cancel button 225. The error location site field 205 may be configured to display a user-defined destination for the error report 200. The user or site-administrator may specify a specific location during the installation of the error reporting application 125. The error location site field 205 may also be configured to accept user input for another destination instead of the predetermined destination or to append another destination to the predetermined destination. The error location site field 205 may accept data as a uniform resource locater (URL), an email address, or other similar identifier for an address.

The file attachment field 210 may be configured to show an attached screen shot of the at least one application when the user detected the error. The file attachment field 210 may be configured to provide a mechanism to add additional screen shots or to delete files as known to those skilled in the art.

The description field 215 may be configured for a user to add additional text describing the detected problem. The submit 220 button may be configured to transmit the error report with any attached files, e.g., a screen shot, to the location specified by the error location site field 205 when activated. The cancel button 220 may be configured to cancel the error report and return the user to the application when activated.

Figure 3:
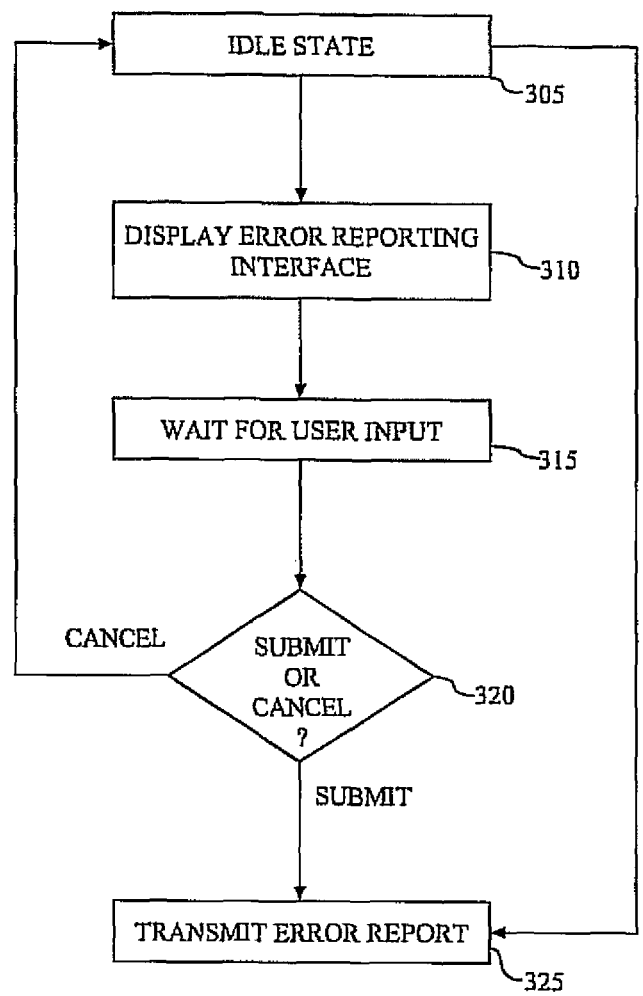
FIG. 3 illustrates flow diagram implemented by the error reporting application in accordance with yet another embodiment.

FIG. 3 illustrates a flow diagram 300 implemented by the error reporting application 125 in accordance with yet another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the error reporting application 125 may be configured to be in idle state, in step 305. More particularly, the error reporting application 125 may have been invoked during the initialization of the operating system or during the initialization of the at least one application. Accordingly, the error reporting application 125 may be in the idle state waiting to be activated by the user.

In step 310, the error reporting application 125 may be configured to take a snapshot of the current state of the at least one application and display an error report in the form of the user interface 200 or other similar graphical user interface for the user. The snapshot may be attached to the error report in the file attachment field 210. More particularly, a user may have been using the at least one application and detected an error, bug or fault in the at least one application. Accordingly, the user may have activated the error reporting application 125 by icon activation, menu option selection or other similar invocation mechanism.

In step 315, the error reporting application 125 may be configured to wait for the user to complete filling out the error report. For example, the user may replace the default predetermined destination with another destination or may append a second destination to the default predetermined destination in the error location site field 205. The user may further describe the detected error in the description field 215 as another example. Alternatively, the user may not modify any of the fields of the user interface 200.

In, step 320, the error reporting application 125 may be configured to wait for the user to activate either the submit button 220 or cancel button 225. If the user activates the submit button 220, the error reporting application 125 may be configured to transmit the error report to the destination address in the error location site field 205 and can respond. Otherwise, if the user activates the cancel button 225, the error reporting application 125 may return to the idle state of step 305 without transmitting the error report.

Figure 4:
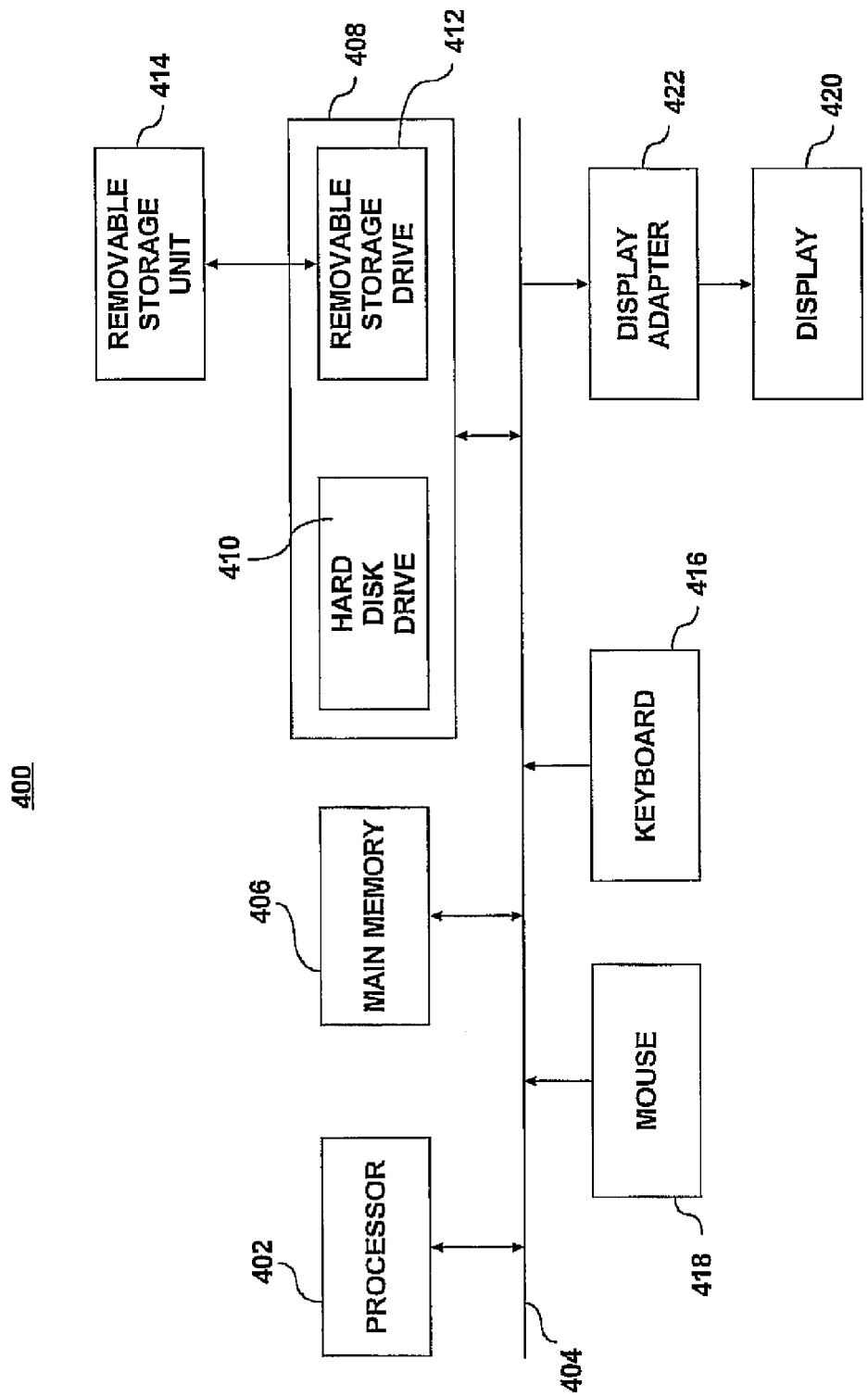
FIG. 4 illustrates an exemplary block diagram of a computing platform where an embodiment may be practiced.

FIG. 4 illustrates an exemplary block diagram of a computing platform 400 where an embodiment may be practiced. The functions of the error reporting application may be implemented in program code and executed by the computing platform 400. The error reporting application may be implemented in computer languages such as PASCAL, C, C++, JAVA, etc.

As shown in FIG. 4, the computer system 400 includes one or more processors, such as processor 402 that provide an execution platform for embodiments of the error reporting application. Commands and data from the processor 402 are communicated over a communication bus 404. The computer system 400 also includes a main memory 406, such as a Random Access Memory (RAM), where the software for the error reporting application may be executed during runtime, and a secondary memory 408. The secondary memory 408 includes, for example, a hard disk drive 410 and/or a removable storage drive 412, representing a floppy diskette drive, a magnetic tape drive, a compact disk drive, etc., where a copy of a computer program embodiment for the error reporting application may be stored. The removable storage drive 412 reads from and/or writes to a removable storage unit 414 in a well-known manner. A user interfaces with the error reporting application with a keyboard 416, a mouse 418, and a display 420. The display adapter 422 interfaces with the communication bus 404 and the display 420 and receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   detecting a bug in a computer-executed application;
   receiving a description of the bug from a user;
   generating an error report comprising the description of the bug;
   transmitting, by a processor, the error report to a configurable location in a local network when a user is operating in an environment separate from the local network; and
   transmitting, by the processor, the error report to a support site when a user is operating within the local network, wherein the support site is separate from the configurable location in the local network.

2. The method of claim 1, further comprising:
   accepting a user-defined location as the configurable location for the error report; and
   transmitting the error report to the user-defined location.

3. The method of claim 2, further comprising:
   accepting a location different from the user-defined location as the configurable location for the error report; and
   transmitting the error report to the location.

4. The method of claim 1, further comprising:
   invoking the processor by the computer-executed application.

5. The method of claim 1, further comprising:
   invoking the processor as a stand-alone application.

6. The method of claim 1, further comprising generating a repair ticket, at the configurable location, in response to receiving the error report.

7. The method of claim 1, further comprising:
   capturing a screen shot of the computer-executed application, wherein the error report comprises the screen shot.

8. The method of claim 1 further comprising:
   receiving a proposed solution to the error report in view of one of preference configured by the user or the user operating environment.

9. A system comprising:
   a plurality of computers, each computer executing an application; and
   a network configured to interconnect each computer of the plurality of computers, wherein a selected computer of the plurality of computers to execute an error reporting application to detect a bug, receive a description of the bug from a user, generate an error report comprising the description of the bug, transmit the error report to a configurable location in a local network when a user is operating in an environment separate from the local network and transmit the error report to a support site when a user is operating within the local network, wherein the support site is separate from the configurable location in the local network.

10. The system of claim 9 the error reporting application to accept a user-defined location as the configurable location for the error report and transmit the error report to the user-defined location.

11. The system of claim 10 the error reporting application to accept a location different from the user-defined location for the error report and transmit the error report to the location.

12. The system of claim 10 wherein the user-defined location is further configured to generate a repair ticket in response to receiving the error report.

13. The system of claim 9 the error reporting application to be executed within the application.

14. The system of claim 9 the error reporting application is a stand-alone application.

15. The system of claim 9, wherein the support site is an error reporting site configured to receive the error report and log the error report in an error database.

16. The system of claim 9 the error reporting application to capture a screen shot of the application, wherein the error report comprises the screen shot.

17. The system of claim 9, the error reporting application to receive proposed solution to the error report in view of one of preference configured by the user or the user operating environment.

18. An apparatus comprising:
a memory to store instructions; and
a processor coupled to the memory, to retrieve the instructions from the memory, and in response to the instructions, to
detect a bug in a computer-executed application, receive a description of the bug from a user, generate an error report comprising the description of the bug,
transmit, the error report to a configurable location in a local network when a user is operating in an environment separate from the local network and transmit the error report to a support site when a user is operating within the local network, wherein the support site is separate from the configurable location in the local network.

19. The apparatus of claim 18 the processor to accept a user-defined location as the configurable location for the error report and transmit the error report to the user-defined location.

20. The apparatus of claim 19, wherein the user-defined location is further configured to generate a repair ticket in response to receiving the error report.

21. The apparatus of claim 19 the processor to accept a location different from the user-defined location for the error report and transmit the error report to the location.

22. The apparatus of claim 18 the processor to capture a screen shot of the computer-executed application, wherein the error report comprises the screen shot.

23. The apparatus of claim 18, the processor to provide a proposed solution to the error report in view of one of preference configured by the user or the user operating environment.

24. A non-transitory computer readable storage medium having instructions stored thereon that, when executed by a processor, cause the processor to perform the following:

detecting a bug in a computer-executed application;
receiving a description of the bug from a user;
generating an error report comprising the description of the bug;
transmitting, by a processor, the error report to a configurable location in a local network when a user is operating in an environment separate from the local network; and
transmitting, by the processor, the error report to a support site when a user is operating within the local network, wherein the support site is separate from the configurable location in the local network.

25. The non-transitory computer readable storage medium of claim 24, further comprising:
accepting a user-defined location as the configurable location for the error report; and
transmitting the error report to the user-defined location.

26. The non-transitory computer readable storage medium of claim 25, further comprising:
accepting a location different from the user-defined location for the error report; and
transmitting the error report to the location.

27. The non-transitory computer readable storage medium of claim 24, further comprising:
capturing a screen shot of the computer-executed application, wherein the error report comprises the screen shot.

28. The non-transitory computer readable storage medium of claim 24 further comprising:
receiving a proposed solution to the error report in view of one of preference configured by the user or the user operating environment.

29. The non-transitory computer readable storage medium of claim 24 further comprising:
generating a repair ticket, at the configurable location, in response to receiving the error report.

* * * * *